July 14, 1959  G. V. MORRIS  2,895,063
AIR DRIVEN REED ELECTRIC GENERATOR
Filed Jan. 19, 1951  2 Sheets-Sheet 1

Inventor
George V. Morris

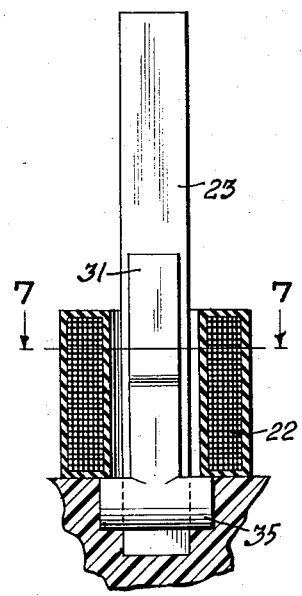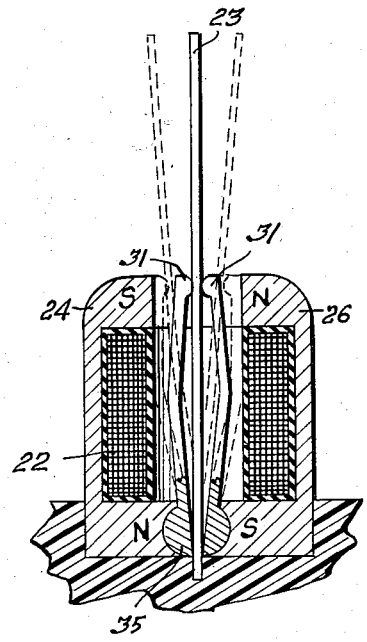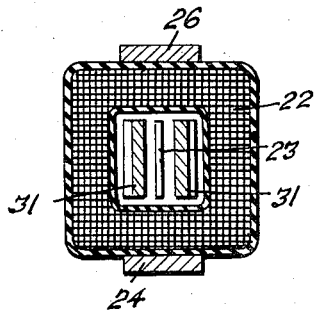

United States Patent Office 2,895,063
Patented July 14, 1959

2,895,063

AIR DRIVEN REED ELECTRIC GENERATOR

George V. Morris, Chicago, Ill., assignor to the United States of America as represented by the Secretary of the Army Application January 19, 1951, Serial No. 206,755

1 Claim. (Cl. 310—15)

This invention relates to air-driven electric generators and more particularly to a small generator intended to be used with a fast-moving vehicle and to be powered by the relative motion of the device through the air.

Air-driven generators are known but they usually consist of a rotatable-armature type generator driven by a propeller or turbine. This construction is relatively complex and expensive and since the voltage is usually dependent upon speed, it is usually difficult to maintain a satisfactory voltage-speed regulation over the wide range of speed which is often encountered. This problem is particularly acute in the case of projectiles, since such projectiles will usually pass through a wide speed range in their flight.

It is a primary object of my invention to obviate the above and other difficulties by providing a generator actuated by the vibration of a reed, which may be of ferromagnetic material and thus act directly in a magnetic field to produce a current by its motion, or the reed may serve to actuate a magnetic armature member. The reed is made to vibrate by the passage of air past it, to facilitate which the reed may be placed in a longitudinal air passage in the projectile. Because the reed vibrates at constant frequency regardless of the velocity of the air stream, it is readily possible to obtain a constant voltage output by suitable design of the generator.

Since conservation of space and weight are particularly important, it is among the objects of my invention to provide a small, lightweight generator of good output, and this, too, I achieve by my invention. I also eliminate or minimize the use of sliding or rolling members, thus reducing friction and the expense of high quality bearings previously necessary to obtain good results.

The specific nature of the invention as well as other objects and advantages thereof, will clearly appear from a description of a preferred embodiment as shown in the accompanying drawing in which:

Fig. 1 is a schematic view of the head of a projectile carrying an electric fuse powered with a generator according to my invention.

Figs. 2, 3, and 4, are schematic views of a reed-actuated generator in its central position and in its two extreme positions, showing the change of flux linkages.

Fig. 5 is a schematic side view of a modified form of my invention, wherein the reed oscillates a heavier iron armature.

Fig. 6 is a side view of the structure shown in Fig. 4 taken at right angles to Fig. 4.

Fig. 7 is a sectional view of the generator of Fig. 4 taken on line 7—7 of Fig. 5.

Figure 1:
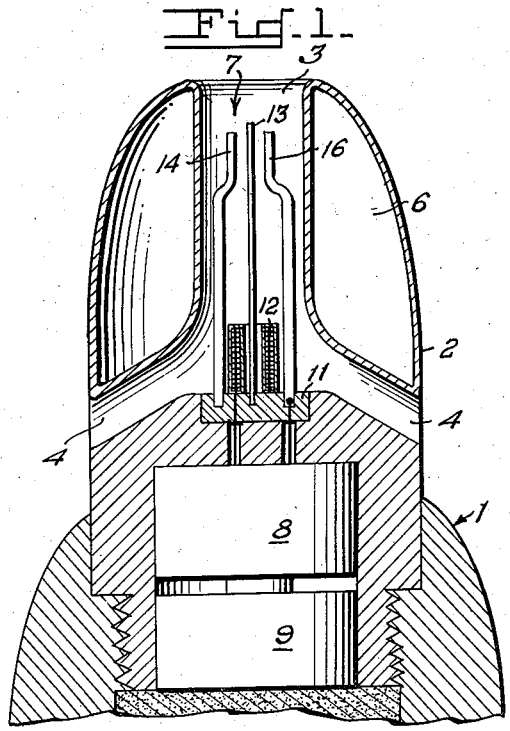

In Fig. 1 a projectile 1 bears a fuse 2 which requires a source of electric power for its operation. This may be a proximity fuse or any other type of electric fuse. The fuse is provided with an axially disposed air inlet passage 3 which leads into a series of circumferentially disposed exhaust passages 4. The structure defining these passages may be hollow as indicated at 6 to provide a space for electrical components of a fuse circuit, if extra space is required. Disposed in inlet passage 3 is the generator 7 of my invention, and also located in the fuse, preferably in the approximate locations indicated, is the customary arming mechanism 8 and a suitable detonator 9.

The generator comprises a permanent magnet 11 at the base thereof provided with pole pieces 14 and 16 between which a thin vibratile reed 13 of magnetic material is arranged to vibrate freely at its own natural resonant frequency. The fixed end of the reed is fastened to the center of magnet 11 as shown, to provide a compact structure. A winding 12 is provided around reed 13 and spaced therefrom to permit free vibration of the reed. This winding may be suitably connected to the circuit elements in space 6 to serve as a source of power therefor, if this space is so utilized.

Figure 2:
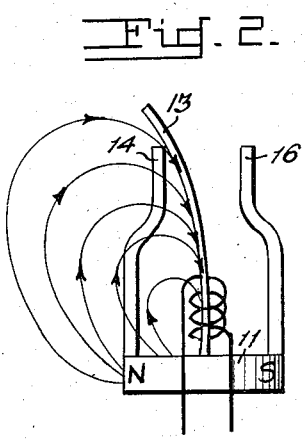
Figure 3:
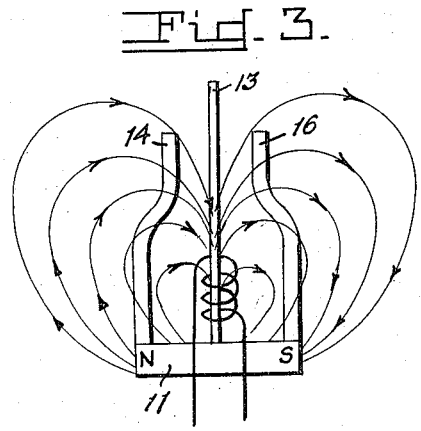
Figure 4:
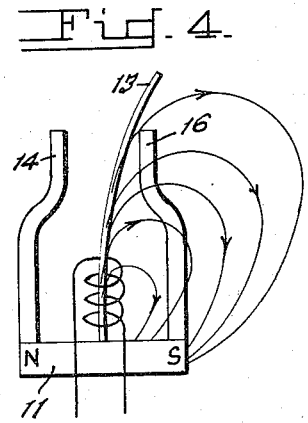

As the projectile passes through the air the air stream in inlet passage 3 will cause the reed to vibrate in known fashion. Assuming the magnetic polarity to be as indicated in Figs. 2, 3, and 4, it will be apparent that as the reed moves between its extreme left and extreme right hand positions, the direction of flux flowing in the reed will be reversed thus inducing an alternating voltage in winding 12. This voltage may be suitably rectified as required for the particular fuse circuit involved, or may be stepped up by suitable transformer means for use in any known or desired fashion as will be understood by those skilled in the art.

Figs. 5 to 7 show a modified form of my invention wherein an auxiliary oscillatable bar armature 31 is utilized as a flux path in the magnetic circuit, being made to oscillate between the pole pieces 24 and 26 by a vibration of thin steel reed 23. This construction provides a heavier armature than is possible when the reed itself is used as a flux path. To improve the mechanical efficiency of the system, reed 23 may be fastened to the armature 31 by so shaping the lower ends of the two armature elements as to provide an oscillatable hub member 35 whereby vibration of the reed may be readily transmitted to the armature member 31. The details of the armature winding 22 may be varied in accordance with known practice to provide the desired voltage magnitude in accordance with conventional principles of design.

It is thus apparent that I have provided a simple, inexpensive and efficient generator construction which satisfies the objects of my invention.

It will be apparent that the embodiments shown are only exemplary and that various modifications can be made in construction and arrangement within the scope of my invention as defined in the appended claim.

I claim:

In combination an electric fuse for a projectile, said fuse having an axially directed air duct, and an electric generator for said fuse in said air duct, said generator comprising a stationary polarized permanent magnet field core member having opposed pole pieces, an armature winding disposed in the field of said core, a vibratile reed disposed in said air duct between said pole pieces, means actuated by vibratory motion of a portion of said reed between said pole pieces for changing the flux linkages in said winding to induce a voltage therein, and a non-flexible armature member mounted for oscillation between said pole pieces, said armature member being mechanically connected to said reed whereby vibratory motion of said reed is imparted to said armature member to cause same to oscillate between said pole pieces.

References Cited in the file of this patent

UNITED STATES PATENTS

| | | |
|---|---|---|
| 2,300,638 | Wente | Nov. 3, 1942 |
| 2,412,624 | Mallina | Dec. 17, 1946 |
| 2,687,482 | Harmon et al. | Aug. 24, 1954 |